US007822533B2

(12) United States Patent
Yoshihara et al.

(10) Patent No.: US 7,822,533 B2
(45) Date of Patent: Oct. 26, 2010

(54) KNOCKING DETERMINATION DEVICE AND KNOCKING DETERMINATION METHOD OF INTERNAL COMBUSTION ENGINE

(75) Inventors: Masatomo Yoshihara, Toyota (JP); Kenji Kasashima, Nishikamo-gun (JP); Rihito Kaneko, Nishikamo-gun (JP); Kenji Senda, Okazaki (JP); Yuuichi Takemura, Anjo (JP); Shuhei Oe, Kariya (JP)

(73) Assignees: Toyota Jidosha Kabushiki Kaisha, Aichi-Ken (JP); Denso Corporation, Achi-Ken (JP); Nippon Soken, Inc, Aichi-Ken (JP)

( * ) Notice: Subject to any disclaimer, the term of this patent is extended or adjusted under 35 U.S.C. 154(b) by 214 days.

(21) Appl. No.: 12/280,753

(22) PCT Filed: May 28, 2007

(86) PCT No.: PCT/JP2007/061240

§ 371 (c)(1), (2), (4) Date: Aug. 26, 2008

(87) PCT Pub. No.: WO2007/139221

PCT Pub. Date: Jun. 12, 2007

(65) Prior Publication Data

US 2009/0005956 A1 Jan. 1, 2009

(30) Foreign Application Priority Data

May 29, 2006 (JP) ............................ 2006-148803

(51) Int. Cl.
*G06F 19/00* (2006.01)
*F02P 5/00* (2006.01)

(52) U.S. Cl. ............ 701/111; 123/406.29; 123/406.38; 73/35.01

(58) Field of Classification Search ......... 701/102–105, 701/111, 115; 123/406.29, 406.34, 406.38, 123/406.39; 73/35.01, 35.03, 35.06
See application file for complete search history.

(56) References Cited

U.S. PATENT DOCUMENTS 4,750,103 A * 6/1988 Abo et al. .................. 701/111

(Continued)

FOREIGN PATENT DOCUMENTS

DE 102004046081 A1 4/2006

(Continued)

OTHER PUBLICATIONS

Office Action issued in counterpart German Patent Application No. 11 2007 001 073. 8-52, dated May 18, 2010, 8 pages.

*Primary Examiner*—John T Kwon
(74) *Attorney, Agent, or Firm*—Sughrue Mion, PLLC

(57) ABSTRACT

An engine ECU executes a program including a step of setting a search range of the crank angle of a peak value P that is the largest integrated value in a vibration waveform of an engine detected by calculating integrated values that are integrals of output voltage values of a knock sensor for every five degrees of a crank angle such that the search range may include the crank angle increasing with increase in engine speed NE, and a step of detecting the crank angle of the largest integrated value in the search range, and setting the detected crank angle as the crank angle of peak value P in the vibration waveform. At the crank angle based on the crank angle of peak value P, the vibration waveform is compared with a knock waveform model.

15 Claims, 15 Drawing Sheets

U.S. PATENT DOCUMENTS

| | | | | |
|---|---|---|---|---|
| 5,460,031 | A * | 10/1995 | Fujishita et al. | 73/35.03 |
| 7,281,516 | B2 * | 10/2007 | Kaneko et al. | 123/406.38 |
| 7,363,142 | B2 * | 4/2008 | Kaneko et al. | 701/111 |
| 7,387,107 | B2 * | 6/2008 | Kaneko et al. | 123/406.21 |
| 7,478,624 | B2 * | 1/2009 | Kaneko et al. | 123/406.37 |
| 7,653,477 | B2 * | 1/2010 | Yoshihara et al. | 701/111 |
| 7,669,459 | B2 * | 3/2010 | Yoshihara et al. | 73/35.06 |
| 2005/0234633 | A1 | 10/2005 | Takemura et al. | |
| 2005/0251320 | A1 | 11/2005 | Kasashima et al. | |
| 2007/0084266 | A1 * | 4/2007 | Kaneko et al. | 73/35.03 |
| 2009/0158816 | A1 * | 6/2009 | Kaneko et al. | 73/35.09 |

FOREIGN PATENT DOCUMENTS

| | | | |
|---|---|---|---|
| EP | 1 586 882 | A2 | 10/2005 |
| JP | 04-076249 | A | 3/1992 |
| JP | 07-139415 | A | 5/1995 |
| JP | 2004-045344 | A | 2/2004 |
| JP | 2004-353531 | A | 12/2004 |
| JP | 2005-023902 | A | 1/2005 |
| JP | 2005-307753 | A | 11/2005 |
| JP | 2005-330954 | A | 12/2005 |
| WO | 2005/103466 | A2 | 11/2005 |

* cited by examiner

KNOCKING DETERMINATION DEVICE AND KNOCKING DETERMINATION METHOD OF INTERNAL COMBUSTION ENGINE

TECHNICAL FIELD

The present invention relates to a knocking determination device and a knocking determination method of an internal combustion engine, and particularly to a technique of determining whether knocking is present or absent based on a waveform of vibration of an internal combustion engine.

BACKGROUND ART

Conventionally, various methods of detecting knocking (knock) that may occur in an internal combustion engine have been proposed. For example, there is a technique of determining occurrence of knocking when magnitude of vibration in an internal combustion engine is greater than a threshold. However, even when the knocking has not occurred, vibrations due to, e.g., closing of intake valves and exhaust valves may exceed the threshold. In this case, it may be erroneously determined that the knocking occurred, although the knocking did not occurred. Accordingly, such a technique has been proposed that the presence or absence of the knocking is determined based on a waveform of vibration for giving consideration to characteristics such as a crank angle at which the vibration occurs and/or attenuation factor, i.e., characteristics other than the magnitude.

Japanese Patent Laying-Open No. 2004-353531 has disclosed a knock control device of an internal combustion engine that precisely determines whether knock occurred or not, using a waveform, and thereby appropriately control a drive or operation state of an internal combustion engine. The knock control device disclosed in Japanese Patent Laying-Open No. 2004-353531 includes a signal detector detecting a vibration waveform signal generating in the internal combustion engine, a frequency separator separating the vibration waveform signal detected by the signal detector into a plurality of frequency components, a waveform setting unit determining a shape of a knock waveform according to values each obtained by magnitude integration that is performed on each of the plurality of frequency components separated by the frequency separator for each predetermined section of a predetermined crank angle, a knock determining unit determining whether the internal combustion engine knocked or not, based on the knock waveform shape set by the waveform shape setting unit, a knock controller controlling an operation state of the internal combustion engine according to a result of the determination by the knock determining unit, and an ideal waveform setting unit that presets, as an ideal knock waveform, an ideal knock waveform shape of a vibration waveform signal occurring in the internal combustion engine. The waveform setting unit corrects the waveform to decrease knock magnitude when an magnitude rising portion preceding a peak of the knock waveform has an magnitude rising rate smaller than that of the ideal knock waveform.

According to the knock control device disclosed in this publication, a vibration waveform signal that occurs in the internal combustion engine and is detected by the signal detecting unit is separated into a plurality of frequency components by the frequency separator. The waveform setting unit sets the knock waveform according to the value obtained by magnitude integration that is performed on the frequency components thus separated for each predetermined section of a predetermined crank angle. Based on the knock waveform, the knock determining unit determines whether the internal combustion engine knocked or not. Based on a result of this determination, the knock controller controls the operation state of the internal combustion engine. In this manner, the vibration waveform signal generated in the internal combustion engine is separated into the plurality of frequency components, and the knock waveform is set by the value obtained by the magnitude integration that is performed on the plurality of separated frequency components for each predetermined section of the predetermined crank angle so that the knock waveform can be represented as the sum or total of the respective vibration modes. According to this knock waveform, it is possible to determine precisely whether the internal combustion engine knocked or not, so that the operation state of the internal combustion engine is appropriately controlled. When the magnitude rising portion preceding the peak of the knock waveform rises at a lower magnitude rising rate than the ideal knock waveform, this portion may be confused with the knock waveform, and therefore is corrected to decrease the magnitude. Since large variations are present in magnitude rising rate of the magnitude rising portion preceding the peak of the knock waveform, correction is performed when the magnitude rising rate is higher than that of the ideal knock waveform, and the correction is performed to decrease the magnitude when the magnitude rising rate is lower than that of the ideal knock waveform. Thereby, it is possible to prevent erroneous detection of knock from a noise waveform different in shape from that of the knock.

When the comparison between the detected waveform and the ideal knock waveform is performed with reference to the peak of the waveform, as is done in the knock control device disclosed in Japanese Patent Laying-Open No. 2004-353531, the crank angle of the peak must be precisely detected. When the crank angle of the peak is erroneously detected, the comparison between the detected waveform and the ideal knock waveform cannot be performed correctly, and an error may occur in determination of whether the knocking occurred or not. However, Japanese Patent Laying-Open No. 2004-353531 has neither disclosed nor suggested a manner of precisely detecting the crank angle, e.g., of the peak that provides a reference for the comparison between the detected waveform and the ideal knock waveform. Therefore, this device is susceptible to further improvement for correctly comparing the detected waveform with the ideal knock waveform and precisely determining whether the knocking occurred or not.

DISCLOSURE OF THE INVENTION

An object of the invention is to provide a knocking determination device and others of an internal combustion engine that can precisely determine whether knocking occurred or not.

A knocking determination device of an internal combustion engine according to an aspect of the invention includes a crank position sensor detecting a crank angle of the internal combustion engine, and an operation unit. The operation unit detects a waveform of vibration of the internal combustion engine in a first range of the crank angle in a manner corresponding to the crank angle, detects a crank angle satisfying a predetermined condition in a second range included in the first range, determines whether the internal combustion engine knocked or not, based on a result of a comparison performed, at the crank angle based on the crank angle satisfying the condition, between the detected waveform and a waveform model having a width smaller than that of the first range and defined as a reference of the waveform of the vibration of the internal combustion engine, detects an operation state of the internal combustion engine, and sets the second range according to the operation state of the internal combustion engine.

According to this structure, the crank angle is detected, and the vibration magnitude of the internal combustion engine according to the crank angle is also detected. Based on this vibration magnitude, the vibration waveform in the first range of the crank angle is detected. When knocking occurs, this waveform has a shape peculiar to the knocking. Therefore, the presence or absence of the knocking can be determined by comparing the detected waveform with the waveform model prepared as a waveform that will be exhibited when the knocking occurs. Preferably, the crank angle used from comparison between the detected waveform and the waveform model is determined based on the predetermined crank angle. In connection with this, if the whole first range is used as the target range for detecting the crank angle to be used as the reference, the processing requires a long time. Accordingly, the crank angle satisfying the predetermined condition is detected in the second range included in the first range. The determination whether internal combustion engine knocked or not is performed based on the result of the comparison that is performed between the detected waveform and the waveform model at the crank angle based on this crank angle thus detected. For detecting the vibration waveform, a device such as a band-pass filter performs signal processing. Therefore, a certain time is required before obtaining the vibration waveform. Also, a certain time elapses after occurrence of the vibration until the vibration propagates to a location, e.g., of the knock sensor. Therefore, the vibration waveform is detected with a delay from the detection of the crank angle. This difference depends on the operation state of the internal combustion engine. For example, the difference increases with an engine speed of the internal combustion engine. Therefore, if the second range is always set with respect to the same crank angle, a crank angle satisfying the condition may fall outside the second range. In this case, the crank angle satisfying the condition cannot be detected. Accordingly, the operation state of the internal combustion engine is detected. The second range for setting the reference value of the crank angle is set according to this operation state. Thereby, the second range can follow the detected waveform, and it is possible to suppress such a situation that the crank angle satisfying the condition falls outside the second range. Therefore, it is possible to detect precisely the crank angle providing the reference of the crank angle for comparing the detected waveform and the waveform model. Consequently, it is possible to provide the knocking determination device of the internal combustion engine that can correctly compare the detected waveform with the waveform mode, and can precisely determine whether the knocking occurred or not.

Preferably, the predetermined condition is that the vibration attains the largest magnitude.

According to this structure, the crank angle satisfying the condition that the vibration attains the largest magnitude is detected. Thereby, the structure can detect the crank angle at which the knocking probably occurred.

Further preferably, the operation state is an engine speed of the internal combustion engine.

According to this structure, the second range in which the crank angle satisfying the condition is detected is set depending on the engine speed of the internal combustion engine. Thereby, the second range follows the detected waveform, and the situation in which the crank angle falls outside the second range can be suppressed. Therefore, it is possible to detect precisely the crank angle providing the reference of the crank angle at which the detected waveform is compared with the waveform model.

Further preferably, the operation unit sets the second range to include the larger crank angle as an engine speed of the internal combustion engine increases.

According to this structure, the second range in which the crank angle satisfying the condition is detected is set to include the larger crank angle as the engine speed of the internal combustion engine increases. Thereby, the waveform in which the second range is detected can follow the waveform detected with a delay from the detection of the crank angle. Therefore, it is possible to suppress the situation in which the crank angle satisfying the condition falls outside the second range. Consequently, it is possible to detect precisely the crank angle providing the reference of the crank angle used for comparison between the waveform model and the waveform detected as the waveform of the vibration of the internal combustion engine.

Further preferably, when the crank angle corresponding to the waveform model includes a crank angle outside the first range in an operation of comparing the detected waveform with the waveform model, the operation unit determines whether the internal combustion engine knocked or not, based on a result of the comparison performed between the waveform model and the detected waveform at the crank angle causing the first range to overlap with the crank angle corresponding to the waveform model.

According to this structure, when the crank angle corresponding to the waveform model includes the crank angle outside the first range in the operation of comparing the detected waveform with the waveform model because of the detection of the waveform delayed from the detection of the crank angle, the waveform model and the detected waveform are compared at the crank angle causing the first range to overlap with the crank angle corresponding to the waveform model. Thereby, the presence or absence of the knocking can be determined while excluding the region where the vibration waveform of the internal combustion engine is not detected. Accordingly, the erroneous determination of the presence or absence of the knocking can be suppressed.

BEST MODES FOR CARRYING OUT THE INVENTION

Figure 1:
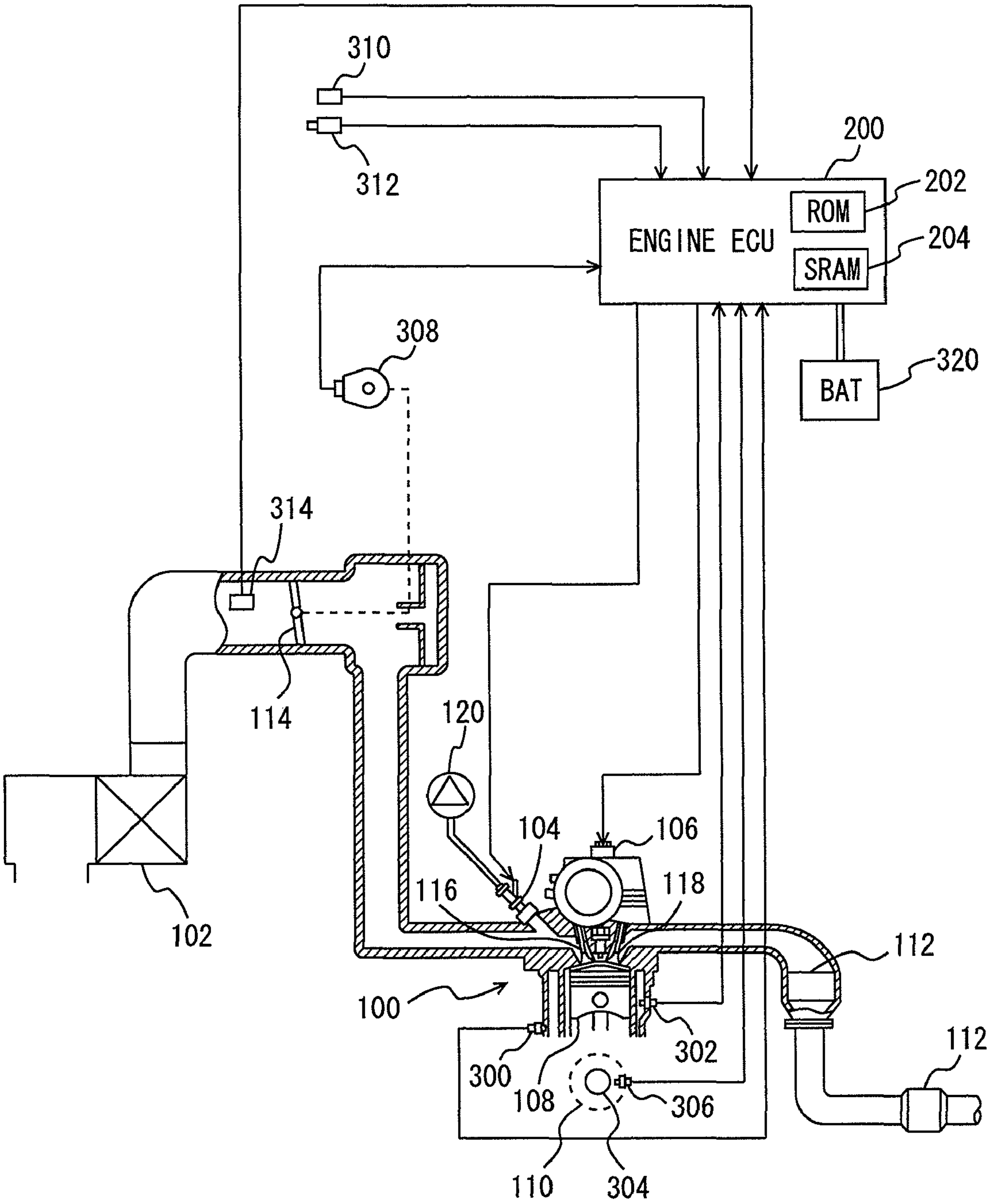
FIG. 1 is a schematic configuration diagram of an engine controlled by an engine ECU which is a knocking determination device according to an embodiment of the present invention.

Embodiments of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle mounted with a knocking determination device according to the embodiment of the present invention will be described. The knocking determination device according to the present invention is accomplished by a program executed by an engine ECU (Electronic Control Unit) 200, for example.

Engine 100 is an internal combustion engine in which an air-fuel mixture of air drawn in from an air cleaner 102 and fuel injected from an injector 104 is ignited by a spark plug 106 and burnt in a combustion chamber. Ignition timing is controlled to be MBT (Minimum advance for Best Torque) at which output torque becomes the maximum but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a throttle opening sensor 308, a vehicle speed sensor 310, an ignition switch 312, and an air flow meter 314.

Knock sensor 300 is arranged at a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is arranged on crankshaft 110 and rotates with crankshaft 110. On an outer periphery of timing rotor 304, a plurality of protrusions are provided at predetermined intervals. Crank position sensor 306 is opposed to the protrusions of the timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle and the number of rotations of crankshaft 110 based on the signal sent from crank position sensor 306.

Throttle opening sensor 308 detects an opening of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects the amount of air taken into engine 100 and sends a signal representing a detection result to engine ECU 200.

Engine ECU 200 operates by electric power supplied from an auxiliary battery 320 that is a power supply. Engine ECU 200 performs computation based on signals sent from the respective sensors and ignition switch 312 as well as map and program stored in ROM (Read Only Memory) 202 or SRAM (Static Random Access Memory) 204 and controls the devices so as to bring engine 100 into a desired operation state.

In the present embodiment, engine ECU 200 detects a waveform of vibration (hereafter referred to as "vibration waveform") of engine 100 in a predetermined knock detection gate (a section between a predetermined first crank angle and a predetermined second crank angle) based on the signal sent from knock sensor 300 and the crank angle and determines whether or not knocking has occurred in engine 100 based on the detected vibration waveform. The knock detection gate in the embodiment is from a top dead center (0°) to 90° in a combustion stroke. The knock detection gate is not limited to it.

Figure 2:
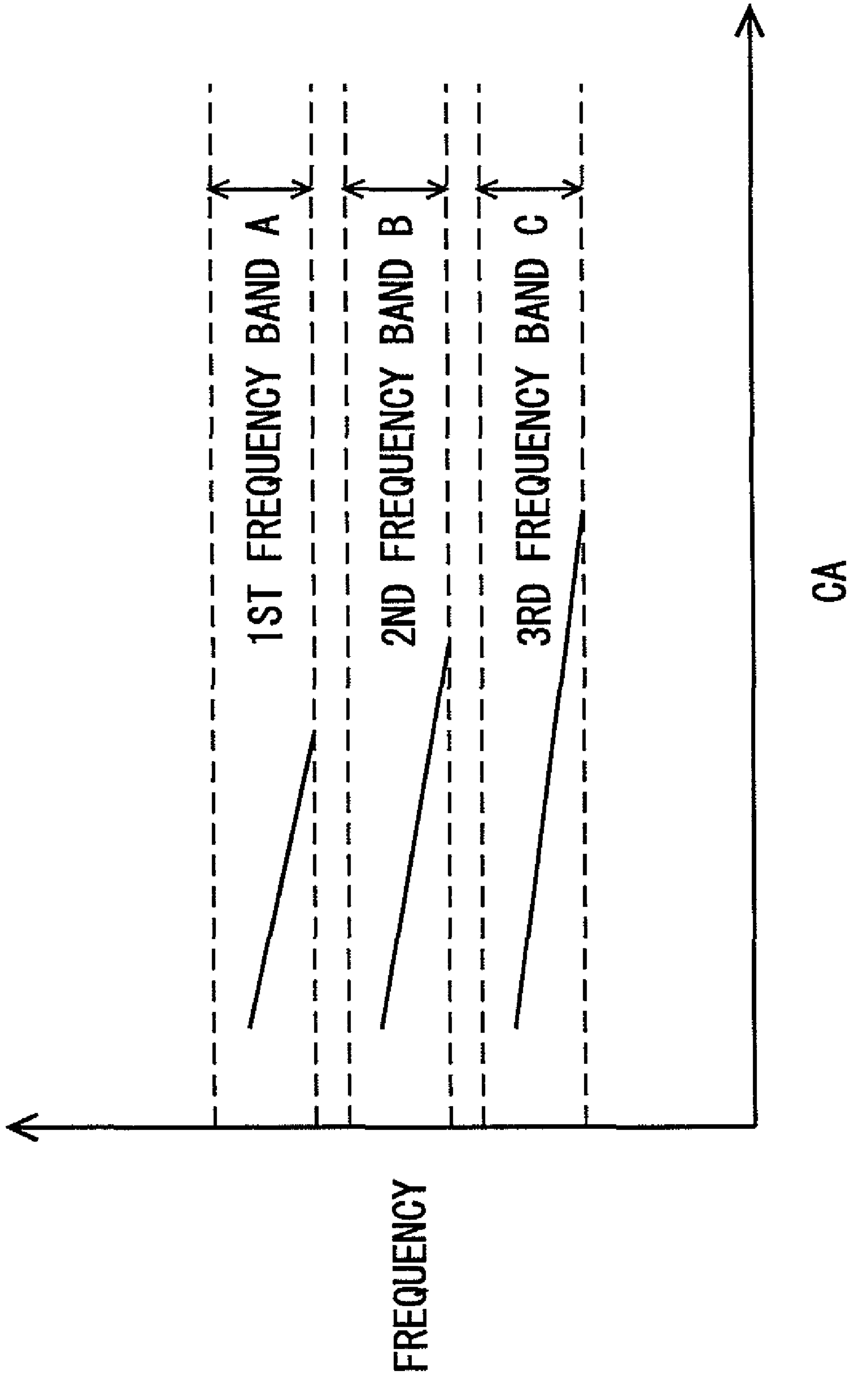
FIG. 2 is a chart showing a frequency band of vibration generated in the engine at the time of knocking.

When knocking occurs, vibration at a frequency near a frequency shown in a solid line in FIG. 2 is generated in engine 100. The frequency of the vibration generated due to the knocking is not constant and varies in a certain range of frequencies. Therefore, in the embodiment, as shown in FIG. 2, vibrations included in a first frequency band A, a second frequency band B, and a third frequency band C, are detected. In FIG. 2, CA designates the crank angle. The number of frequency bands of vibrations generated due to the knocking is not restricted to three.

Figure 3:
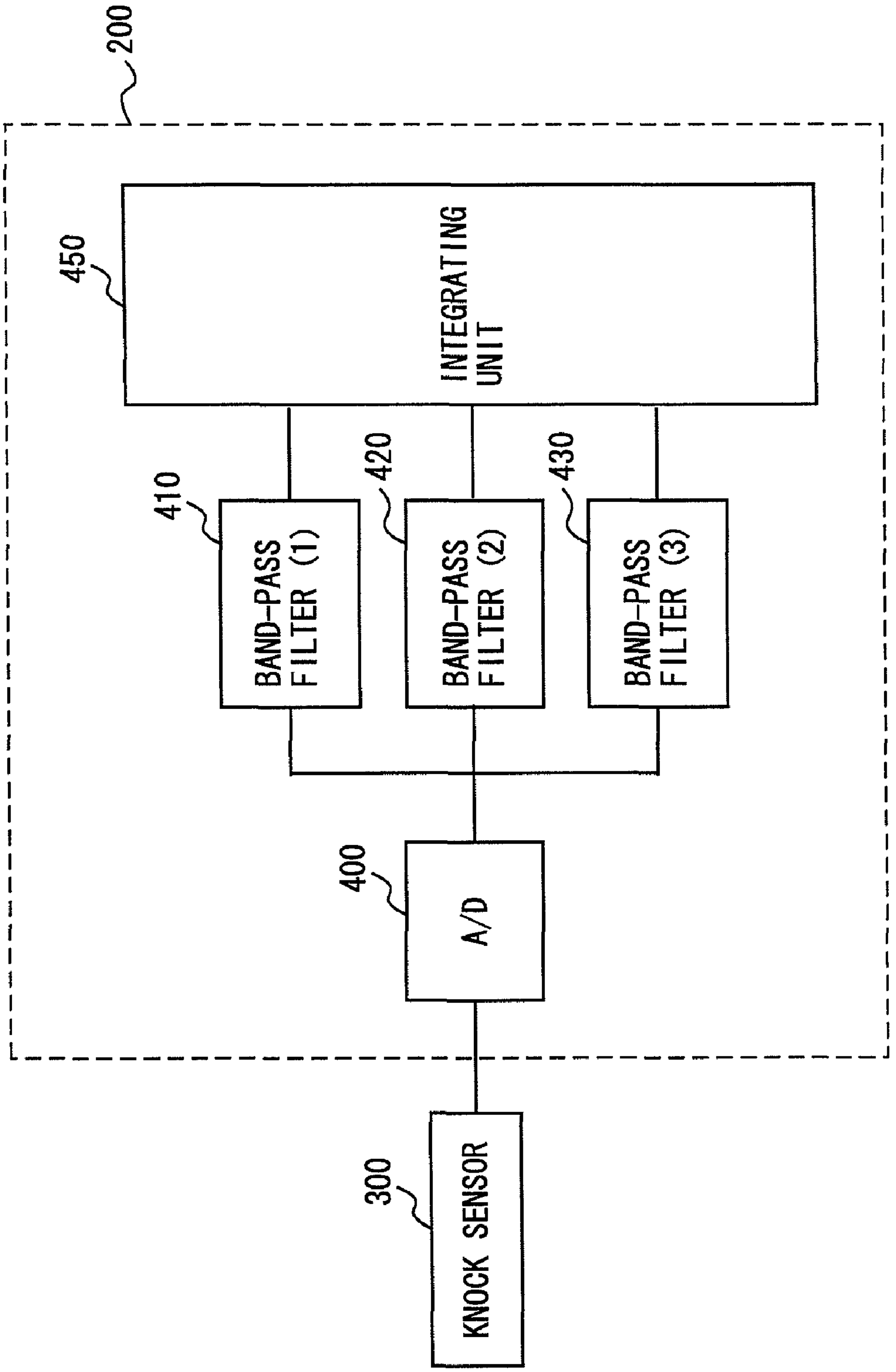
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter (1) 410, a band-pass filter (2) 420, a band-pass filter (3) 430, and an integrating unit 450.

A/D converter 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor 300. In other words, by band-pass filter (3) 430, only vibrations in third frequency band C are extracted from vibrations detected by knock sensor 300.

Integrating unit 450 integrates signals selected by the band-pass filters 410 to (3) 430, i.e., magnitudes of vibrations for a crank angle of 5° at a time. A value obtained by the integration will hereafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

Figure 4:
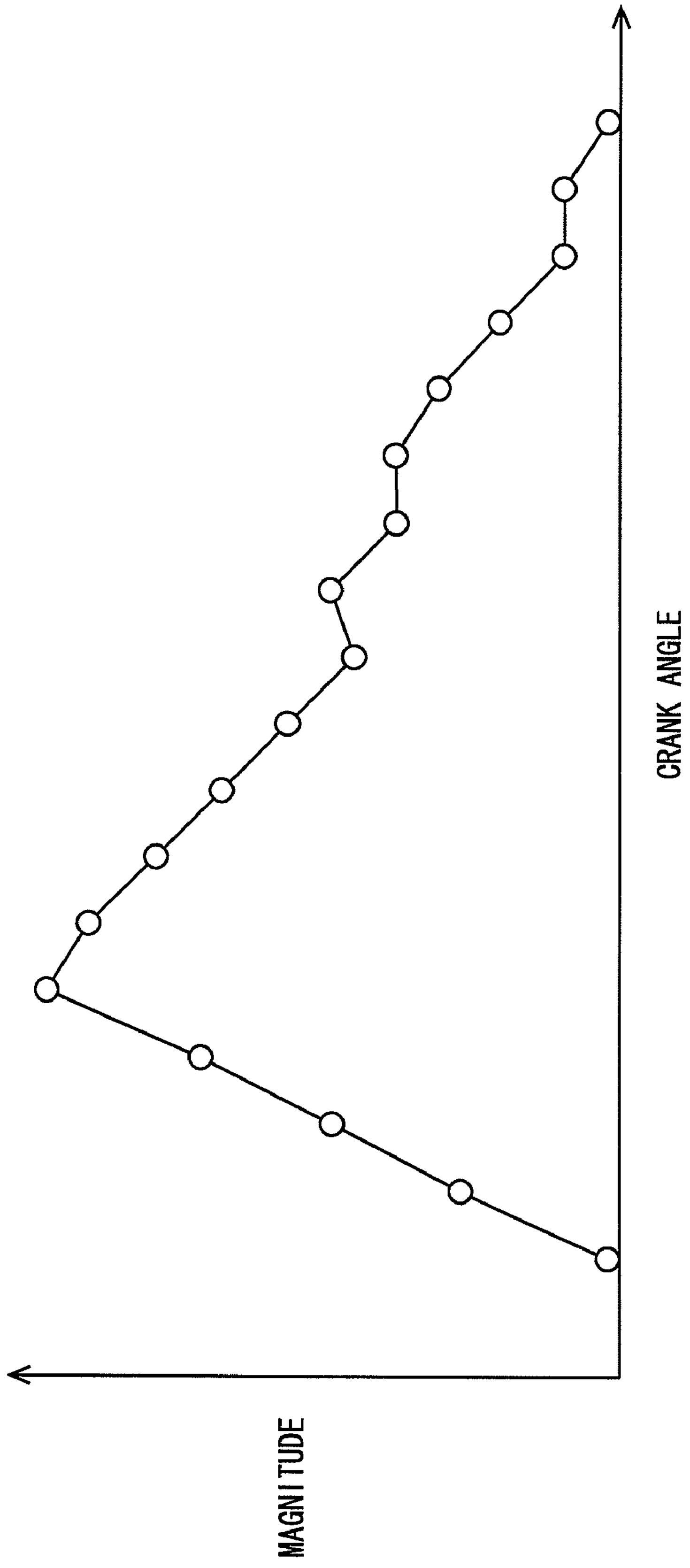
FIG. 4 is a chart showing a waveform of vibration in the engine.

As a result, as shown in FIG. 4, a vibration waveform of engine 100 is detected. In other words, the synthesized waveform of the first to third frequency bands A to C is used as the vibration waveform of engine 100.

Figure 5:
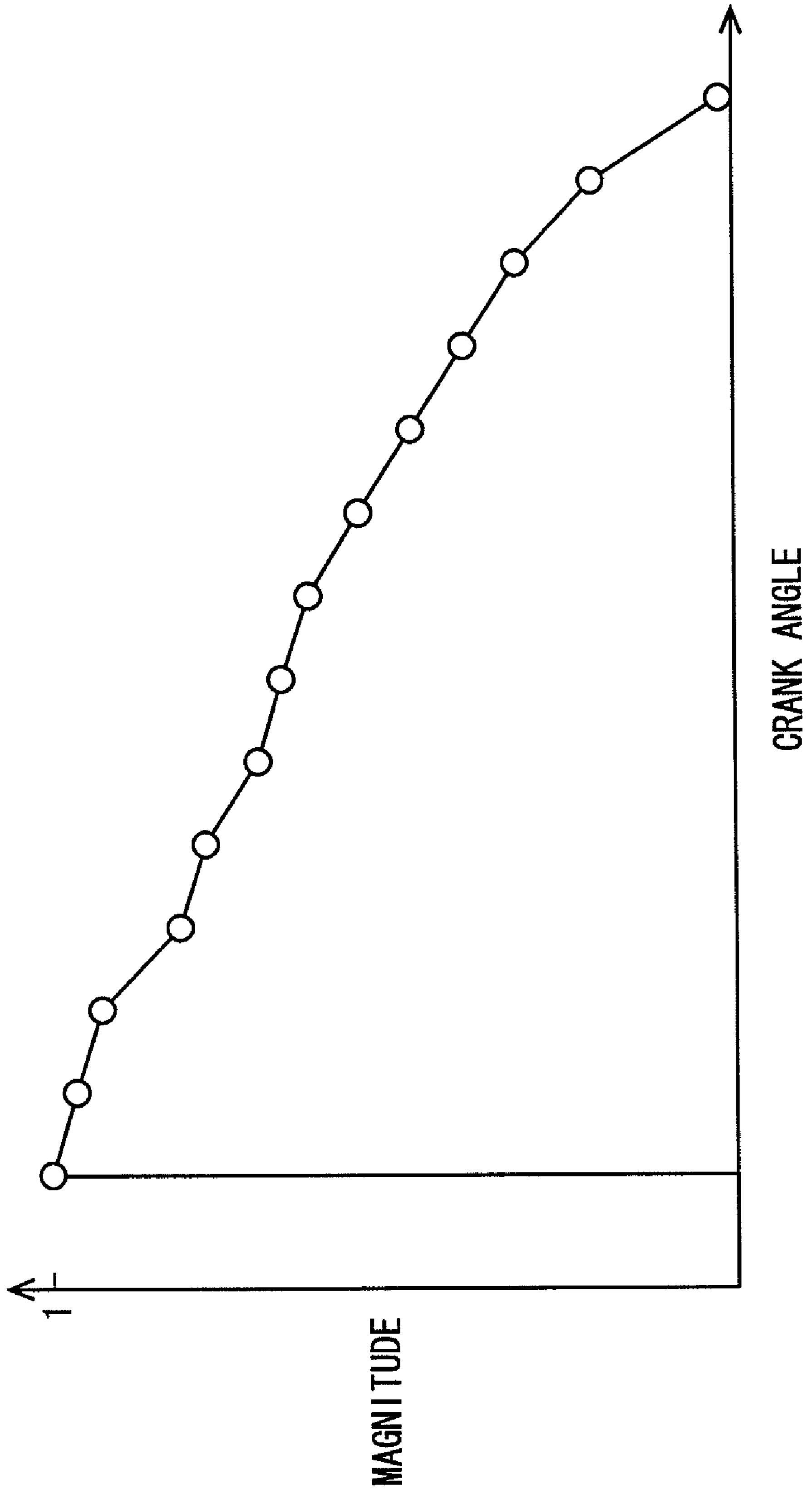
FIG. 5 is a chart showing a knock waveform model stored in ROM of the engine ECU.

The detected vibration waveform is compared with a knock waveform model stored in ROM 202 of engine ECU 200 as shown in FIG. 5. The knock waveform model is formed in advance as a model of a vibration waveform to be exhibited when the knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the embodiment, it is determined that the magnitude of the vibration decreases as the crank angle increases after a peak value of the magnitude of the vibration, but a crank angle at which the magnitude of the vibration becomes the peak value is not determined. The knock waveform model has a shorter width in crank angle than the knock detection gate.

The knock waveform model in the embodiment corresponds to the vibration after the peak value of the magnitude of the vibration generated due to the knocking. It is also possible to store a knock waveform model corresponding to vibration after a rising edge of the vibration caused by the knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in the case where the knocking is forcibly generated in the median characteristic engine. A method of forming the knock waveform model is not limited to it and it is also possible to form the model by simulation.

Figure 6:
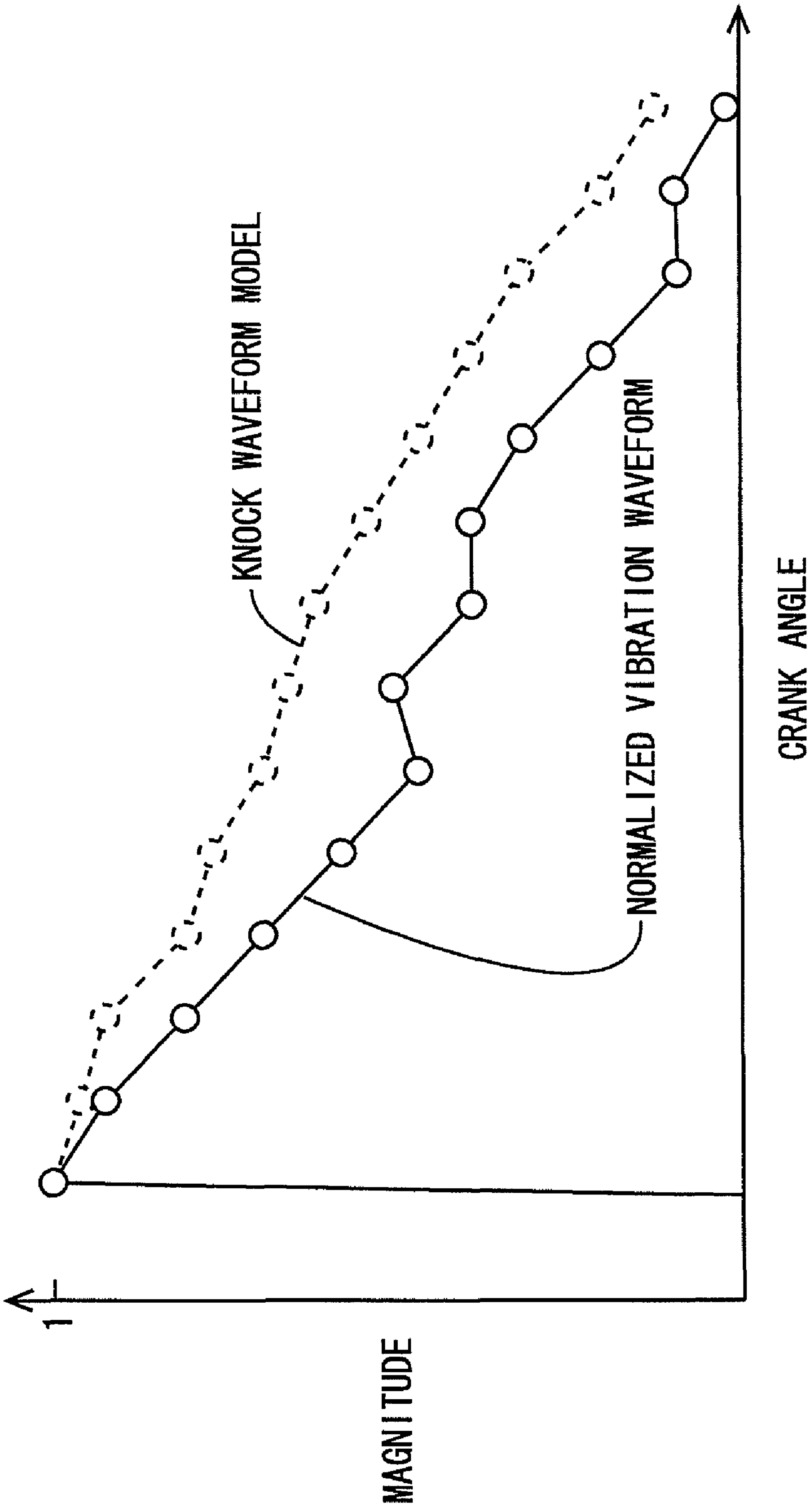
FIG. 6 is a chart (No. 1) for comparing the vibration waveform with the knock waveform model.

In comparison between the detected waveform and the knock waveform model, as shown in FIG. 6, a normalized waveform and the knock waveform model are compared with each other. Here, normalization means to express the magnitude of the vibration as a dimensionless number in a range of 0 to 1 by dividing each integrated value by a maximum value of the integrated value in the detected vibration waveform, for example. However, a method of normalization is not limited to it.

In the embodiment, engine ECU 200 calculates a correlation coefficient K which is a value related to a deviation of the normalized vibration waveform and the knock waveform model from each other. With timing at which the magnitude of the vibration becomes a maximum value in the vibration waveform after the normalization and timing at which the magnitude of the vibration becomes a maximum value in the knock waveform model synchronized, an absolute value (deviation amount) of the deviation of the vibration waveform after the normalization and the knock waveform model from each other is calculated at each crank angle (at every 5° of crank angle) to thereby calculate correlation coefficient K.

When the absolute value of the deviation of the vibration waveform after the normalization and the knock waveform model from each other at each crank angle is $\Delta S(I)$ (I is a natural number) and a value (an area of the knock waveform model) obtained by integrating the magnitude of vibration in the knock waveform model by the crank angle is S, correlation coefficient K is calculated by an equation, $K=(S-\Sigma\Delta S(I))/S$, where $\Sigma\Delta S(I)$ is the total of $\Delta S(I)$. In the embodiment, the closer a shape of the vibration waveform to a shape of the knock waveform model, the greater value correlation coefficient K is calculated as. Therefore, when a waveform of vibration caused by factors other than the knocking is included in the vibration waveform, correlation coefficient K is calculated as a small value. A method of calculating correlation coefficient K is not limited to it.

Furthermore, engine ECU 200 calculates a knock magnitude N based on the maximum value (peak value) of the integrated values. When the maximum integrated value is P and a value representing the magnitude of vibration of engine 100 where knocking does not occur is BGL (Back Ground Level), knock magnitude N is calculated by an equation, $N=P/BGL$. It is noted that maximum integrated value P used in calculating knock magnitude N is logarithmically converted. A method of calculating knock magnitude N is not limited to it.

BGL is calculated as a value obtained by subtracting the product of a standard deviation σ and a coefficient (for example "1") from a median value V(50) in the frequency distribution of magnitude values LOG(V), which will be described later. A method of calculating BGL is not limited to it, and BGL may also be stored in ROM 202 in advance.

In the embodiment, engine ECU 200 compares calculated knock magnitude N and a determination value V(KX) stored in SRAM 204 with each other, and further compares the detected waveform and the stored knock waveform model with each other. Then engine ECU 200 determines whether or not knocking has occurred in engine 100 for every ignition cycle.

Figure 7:
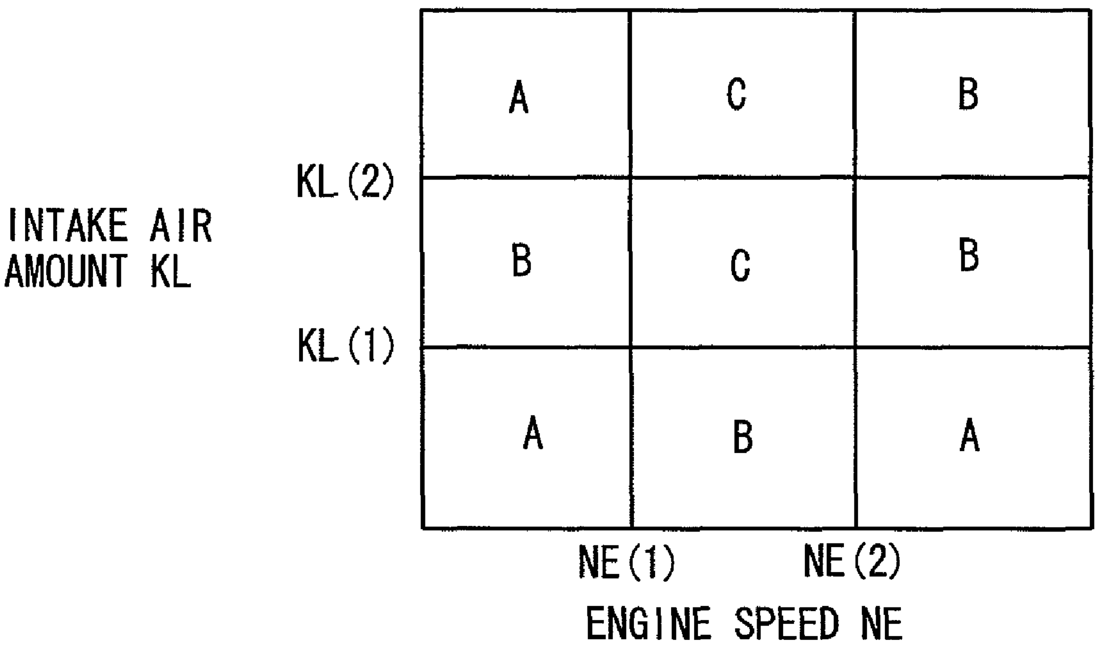
FIG. 7 is a chart showing a map of a determination value V(KX) stored in the ROM or SRAM of the engine ECU.

As shown in FIG. 7, determination values V(KX) are stored as a map for each range divided by an operation state using an engine speed NE and an intake air amount KL as parameters. In the embodiment, nine ranges for each cylinder are provided, which are divided as follows: low speed ($NE<NE(1)$); medium speed ($NE(1)\leqq NE<NE(2)$); high speed ($NE(2)\leqq NE$); low load ($KL<KL(1)$); medium load ($KL(1)\leqq KL<KL(2)$); and high load ($KL(2)\leqq KL$). The number of the ranges is not limited to it. The ranges may be divided using parameters other than engine speed NE and intake air amount KL.

At the time of shipment of engine 100 or the vehicle, a value determined in advance by an experiment or the like is used as determination value V(KX) stored in ROM 202 (an initial value of determination value V(KX) at the time of shipment). However, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Therefore, in the embodiment, a knock determination level V(KD) is calculated based on frequency distribution representing a relationship between a magnitude value LOG(V) which is a value obtained by logarithmically converting magnitudes V and a frequency (the number of times, a probability) of detection of each magnitude value LOG(V).

Magnitude value LOG(V) is calculated for each range in which engine speed NE and intake air amount KL are used as parameters. Magnitude V used for calculating magnitude value LOG(V) is a peak value (peak value of integrated values at every 5°) of magnitudes between predetermined crank angles. Based on calculated magnitude value LOG(V), median value V(50) at which the accumulative sum of frequencies of magnitudes LOG(V) from the minimum value reaches 50% is calculated. Furthermore, a standard deviation σ of magnitude values LOG(V) equal to or smaller than median value V(50) is calculated. For example, in the embodiment, a median value V(50) and a standard deviation σ, which approximate the median value and standard deviation calculated based on a plurality of magnitude values LOG (V) (e.g., 200 cycles), are calculated for each ignition cycle by the following calculation method.

When a currently detected magnitude value LOG(V) is greater than a previously calculated median value V(50), then a value obtained by adding a predetermined value C(1) to the previously calculated median value V(50) is calculated as a current median value V(50). On the other hand, when a currently detected magnitude value LOG(V) is smaller than a previously calculated median value V(50), then a value obtained by subtracting a predetermined value C(2) (e.g., C(2) and C(1) are the same value) from the previously calculated median value V(50) is calculated as a current median value V(50).

When a currently detected magnitude value LOG(V) is smaller than a previously calculated median value V(50) and greater than a value obtained by subtracting a previously calculated standard deviation σ from the previously calculated median value V(50), then a value obtained by subtracting a value twice as large as a predetermined value C(3) from the previously calculated standard deviation σ is calculated as a current standard deviation σ. On the other hand, when a currently detected magnitude value LOG(V) is greater than a previously calculated median value V(50) or smaller than a value obtained by subtracting a previously calculated standard deviation σ from the previously calculated median value V(50), then a value obtained by adding a predetermined value C(4) (e.g., C(3) and C(4) are the same value) to the previously calculated standard deviation σ is calculated as a current standard deviation σ. A method of calculating median value V(50) and standard deviation σ is not limited to it. Also, initial values of median value V(50) and standard deviation σ may be values set in advance or may be "0".

Figure 8:
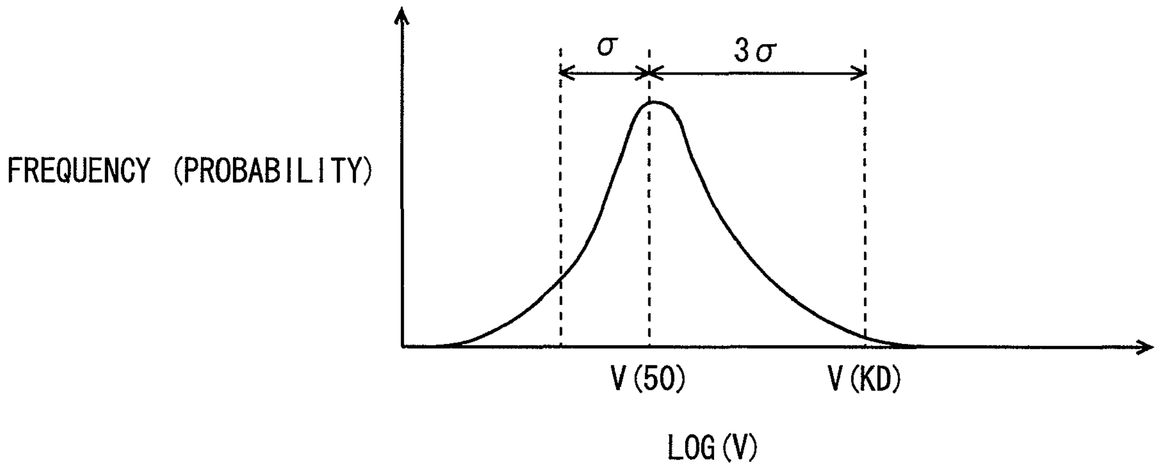
FIG. 8 is a chart (No. 1) showing frequency distribution of magnitude values LOG(V).

Using median value V(50) and standard deviation σ, a knock determination level V(KD) is calculated. As shown in FIG. 8, a value obtained by adding the product of a coefficient U(1) (U(1) is a constant and U(1)=3, for example) and standard deviation σ to median value V(50) is a knock determination level V(KD). A method of calculating knock determination level V(KD) is not limited to it.

Proportion (frequency) of magnitude values LOG(V) greater than knock determination level V(KD) is determined as a frequency of occurrence of knocking, and counted as knock proportion KC. When knock proportion KC is greater than a threshold value KC(0), then determination value V(KX) is corrected to be reduced by a predetermined correction amount so that the frequency of retarding ignition timing becomes higher. When knock proportion KC is smaller than threshold value KC(0), then determination value V(KX) is corrected to be increased by a predetermined correction amount so that the frequency of advancing ignition timing becomes higher.

Coefficient U(1) is a coefficient obtained based on data and findings obtained by experiments and the like. Magnitude value LOG(V) greater than knock determination level V(KD) when U(1)=3 substantially agrees with magnitude value LOG (V) in an ignition cycle in which knocking has actually occurred. It is also possible to use other values than "3" as coefficient U(1).

Figure 9:
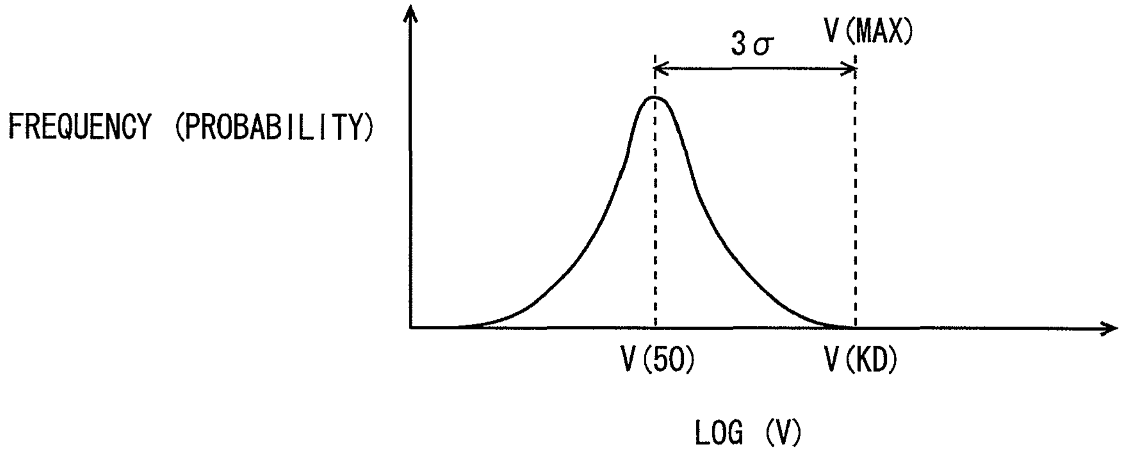
FIG. 9 is a chart (No. 2) showing frequency distribution of magnitude values LOG(V).
Figure 10:
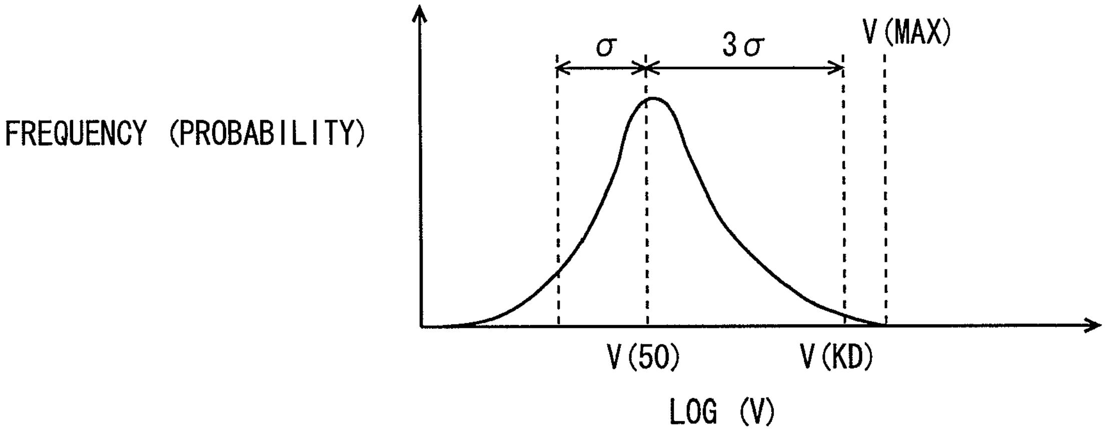
FIG. 10 is a chart (No. 3) showing frequency distribution of magnitude values LOG(V).

When knocking is not occurring in engine 100, the frequency distribution of magnitude values LOG(V) becomes normal distribution as shown in FIG. 9, and maximum value V(MAX) of magnitude value LOG(V) and knock determination level V(KD) agree with each other. On the other hand, by the occurrence of knocking, a greater magnitude V is detected. When a great magnitude value LOG(V) is calculated, as shown in FIG. 10, maximum value V(MAX) becomes greater than knock determination level V(KD).

Figure 11:
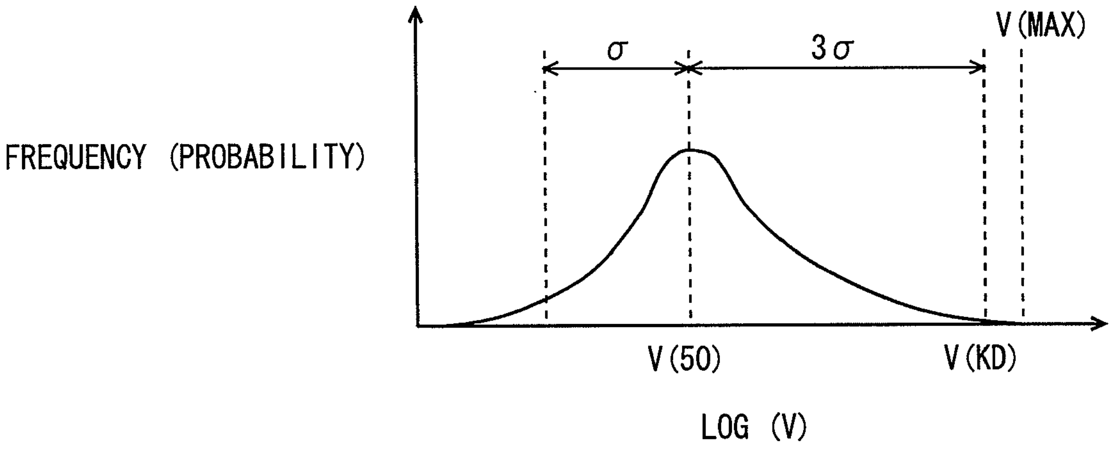
FIG. 11 is a chart (No. 4) showing frequency distribution of magnitude values LOG(V).

When the frequency of occurrence of knocking becomes further higher, as shown in FIG. 11, maximum value V(MAX) becomes further greater. Median value V(50) and standard deviation σ in the frequency distribution become greater as maximum value V(MAX) does. As a result, knock determination level V(KD) becomes greater.

A magnitude value LOG(V) smaller than knock determination level V(KD) is not determined as a magnitude value LOG(V) in a cycle in which a knocking has occurred. Therefore, as knock determination level V(KD) becomes greater, the frequency of determining that knocking has not occurred while knocking has actually occurred becomes greater.

Figure 12:
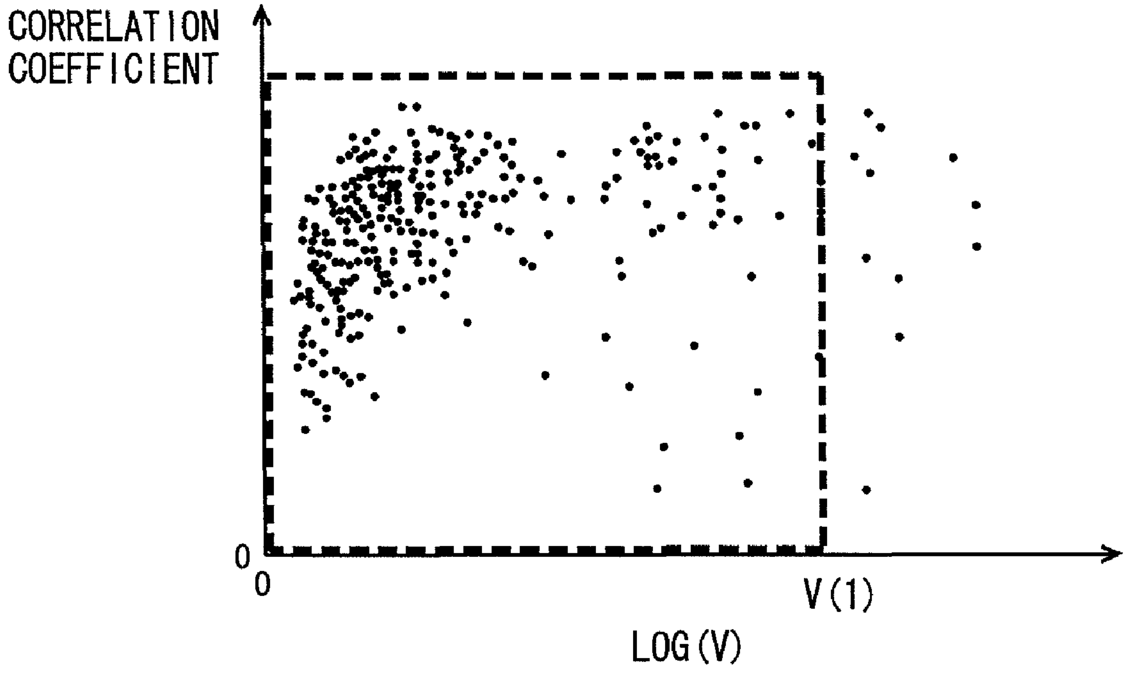
FIG. 12 is a chart showing magnitude values LOG(V) used for forming the frequency distribution of the magnitude values LOG(V).

Therefore, in the embodiment, magnitude values LOG(V) in a range surrounded with a broken line in FIG. 12 are used so that median value V(50) and standard deviation σ are calculated without using magnitude values LOG(V) greater than a threshold value V(1). FIG. 12 is a chart in which calculated magnitude values LOG(V) are plotted for each correlation coefficient K in a cycle in which the magnitude values LOG(V) are obtained.

Threshold value V(1) is a value obtained by adding, to a median value of frequency distribution of magnitude values LOG(V), the product of a coefficient U(2) (U(2) is a constant and U(2)=3, for example) and a standard deviation of magnitude values LOG(V) equal to or smaller than the median value.

By extracting only magnitude values LOG(V) smaller than threshold value V(1) to calculate median value V(50) and standard deviation σ, median value V(50) and standard deviation σ do not become excessively great, and become stable values. As a result, knock determination level V(KD) can be suppressed from becoming excessively high. Therefore, the frequency of determining that knocking has not occurred while knocking has actually occurred can be suppressed from becoming high.

The method of extracting magnitude values LOG(V) used for calculating median value V(50) and standard deviation σ is not limited to it. For example, out of magnitude values LOG(V) smaller than threshold value V(1) described above, magnitude values LOG(V) calculated in the ignition cycles in which correlation coefficient K is greater than threshold value K(1) may be extracted.

Figure 13:
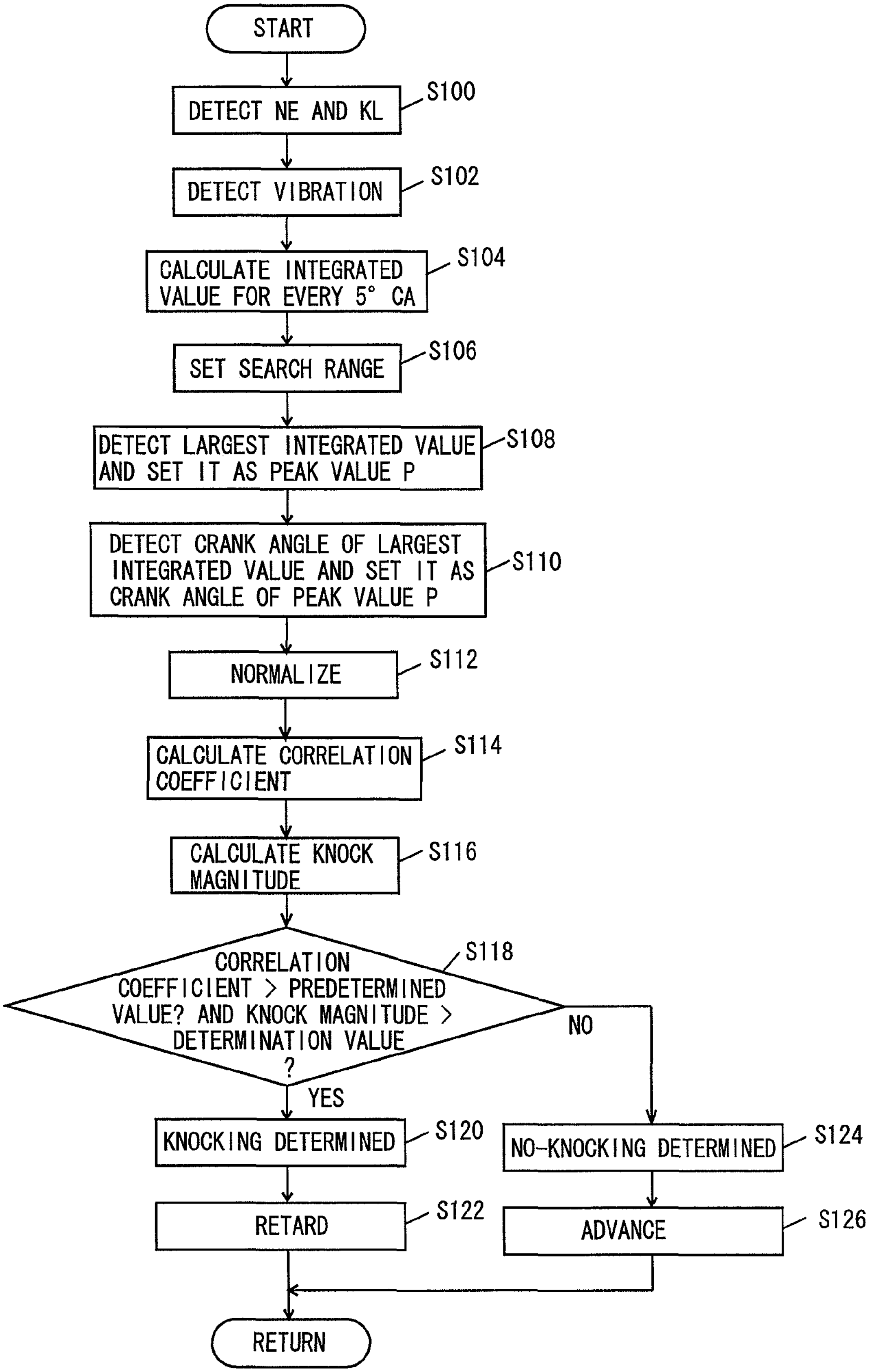
FIG. 13 is a flowchart showing a control structure of the program executed by the engine ECU which is the knocking determination device according to the embodiment of the present invention.

With reference to FIG. 13, a control structure of a program executed by engine ECU 200 which is the knocking determination device according to the embodiment so as to control the ignition timing by determining whether or not knocking has occurred in each ignition cycle will be described.

In step 100 (hereafter "step" will be abbreviated to "S"), engine ECU 200 detects engine speed NE based on a signal sent from crank position sensor 306 and detects intake air amount KL based on a signal sent from air flow meter 314.

In S102, engine ECU 200 detects magnitude of vibration of engine 100 based on a signal sent from knock sensor 300. The magnitude of the vibration is expressed as an output voltage of knock sensor 300. The magnitude of the vibration may be expressed as a value corresponding to the output voltage of knock sensor 300. Detection of the magnitude is carried out between the top dead center and 90° (a crank angle of 90°) in a combustion stroke.

In S104, engine ECU 200 calculates a value (integrated value) obtained by integrating output voltages (values representing magnitudes of vibrations) of knock sensor 300 for every 5° (for 5°) of crank angle. The integrated value is calculated for vibrations in each of first to third frequency bands A to C. Moreover, integrated values in the first to third frequency bands A to C are added to correspond to the crank angles to thereby detect a vibration waveform of engine 100.

In S106, engine ECU 200 sets, based on engine speed NE, a search range for the crank angle of the largest integrated value (peak value P) out of integrated values in a synthesized waveform (vibration waveform of engine 100) of the first to third frequency bands A to C.

The search range is included in the knock search gate, and has a constant width. The search range is shifted toward on a retarded side to include a larger crank angle with increase in engine speed NE. Further, based on results of simulations and/or experiments, the search range is set to include a crank angle at which the integrated value attains peak value P.

In S108, engine ECU 200 detects the largest integrated value in the search range, and sets the detected integrated value as peak value P in the vibration waveform. Thus, engine ECU 200 searches the search range for peak value P.

In S110, engine ECU 200 detects the crank angle of the largest integrated value in the search range, and sets the detected crank angle as the crank angle of peak value P in the vibration waveform. Thus, engine ECU 200 searches the search range for the crank angle of peak value P.

In S112, engine ECU 200 normalizes the vibration waveform of engine 100. Normalization means to express the magnitude of the vibration as a dimensionless number in a range of 0 to 1 by dividing each integrated value by calculated peak value P.

In S114, engine ECU 200 calculates correlation coefficient K that is the value related to the deviation of the vibration waveform from the knock waveform model, with the crank angle of peak value P matching with timing that attains the largest vibration magnitude in the knock waveform model. Thus, correlation coefficient K is calculated by comparing the vibration waveform and the knock waveform at the crank angle based on the crank angle of peak value P.

When the crank angle corresponding to the knock waveform model includes the crank angle outside the knock detection gate, the comparison is performed between the vibration waveform and the knock waveform model in a range of the crank angle from peak value P to the end of the knock detection gate, and thereby correlation coefficient K is calculated.

In S116, engine ECU 200 divides peak value P by BGL to calculate knock magnitude N.

In S118, engine ECU 200 determines whether correlation coefficient K is greater than a predetermined value and further knock magnitude N is greater than determination value V(KX), or not. When correlation coefficient K is greater than a predetermined value and knock magnitude N is greater than determination value V(KX) (YES in S118), the processing moves to S120. Otherwise (NO in S118), the processing moves to S124.

In S120, engine ECU 200 determines that knocking has occurred in engine 100. In S122, engine ECU 200 retards the ignition timing.

In S124, engine ECU 200 determines that knocking has not occurred in engine 100. In S126, engine ECU 200 advances the ignition timing.

Operation of engine ECU 200 which is the knocking determination device according to the embodiment based on the above configuration and flowcharts will be described.

During an operation of engine 100, engine speed NE is detected based on the signal sent from crank position sensor 306 and intake air amount KL is detected based on the signal sent from air flow meter 314 (S100). Moreover, based on the signal sent from knock sensor 300, a magnitude of vibration of engine 100 is detected (S102).

Between the top dead center and 90° in the combustion stroke, the integrated value for every 5° of vibrations in each of the first to third frequency bands A to C is calculated (S104). The calculated integrated values in the first to third frequency bands A to C are added to correspond to the crank angles to thereby detect the above-described vibration waveform of engine 100 as shown in FIG. 4.

As an integrated value for every five degrees is used to detect a vibration waveform, it becomes possible to suppress delicate variations of magnitude in a vibration waveform. Therefore, it becomes easy to compare the detected vibration waveform and the knock waveform model with each other.

The detected vibration waveform and the knock waveform model are compared with each other at the crank angle based on the crank angle providing the largest integrated value in the vibration waveform. Therefore, it is necessary to detect the crank angle providing the largest integrated value.

Figure 14:
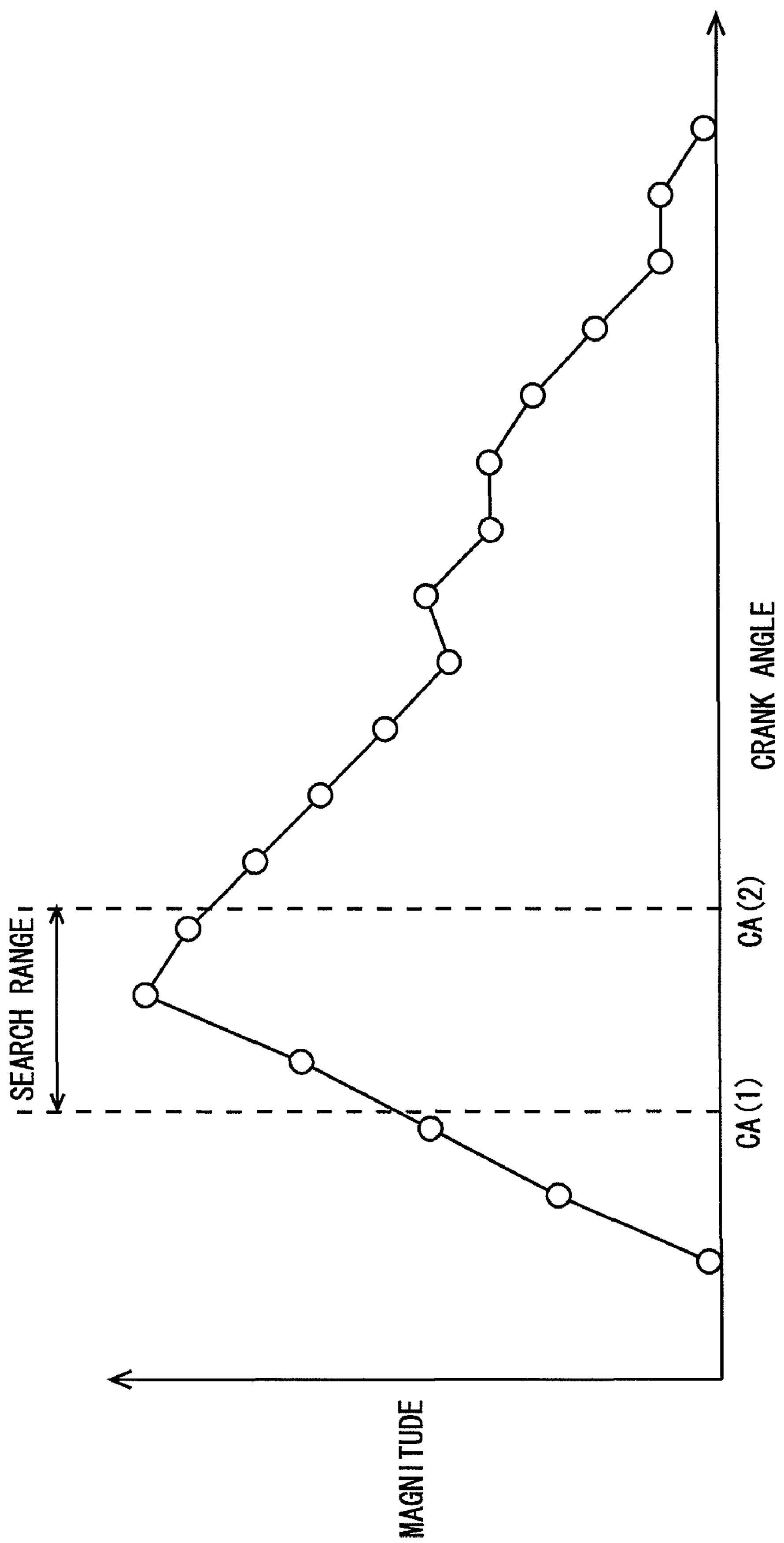
FIG. 14 is a chart (No. 1) illustrating a search range of a peak value P.
Figure 15:
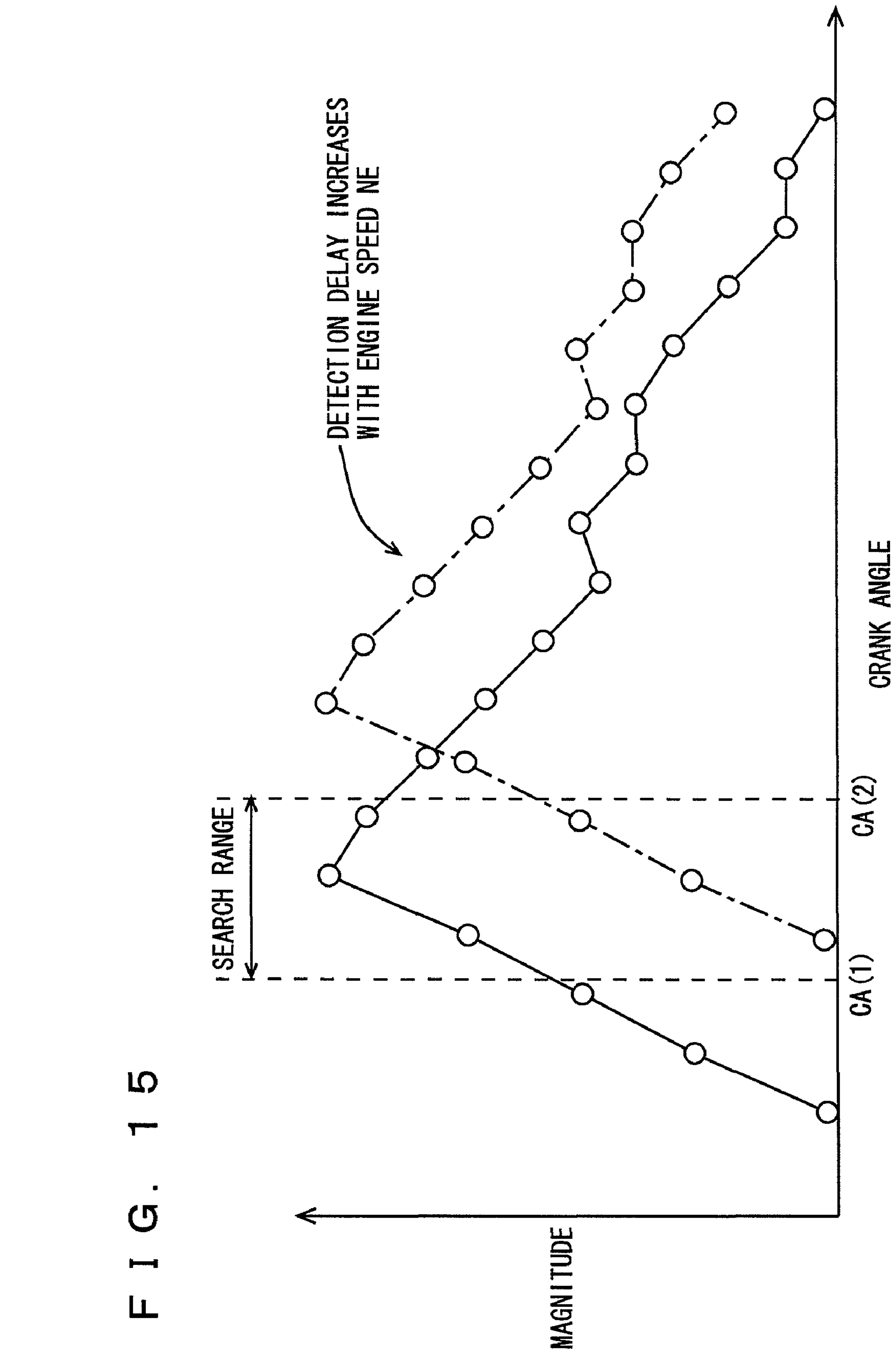
FIG. 15 is a chart (No. 2) illustrating a search range of a peak value P.

The knocking occurs in substantially the same range of the crank angle independently of the operation state. Therefore, it is not necessary to search the whole range of the knock detection gate for peak value P of the integrated value in the vibration waveform and the crank angle thereof, and it is merely required to search only a part of the range. Accordingly, as illustrated in FIG. 14, the search range of the crank angle of peak value P is set such that it is included in the knock detection gate and has a certain width (S106).

However, the processing using the band-pass filter is performed for detecting the vibration waveform so that a certain time is required for obtaining the vibration waveform. Also, a certain time is required before the vibration is propagated to a location of knock sensor 300 after occurrence of the vibration. Therefore, the vibration waveform is detected with a delay from the crank angle at which the vibration actually occurred, i.e., the crank angle detected by crank position sensor 306. This difference increases with engine speed NE.

Therefore, if the search range is always set with respect to the same crank angle, the crank angle of peak value P in the vibration waveform may fall outside the search range as indicated by an alternate long and short dash line. In this case, an integrated value smaller than actual peak value P may be set as peak value P.

Figure 16:
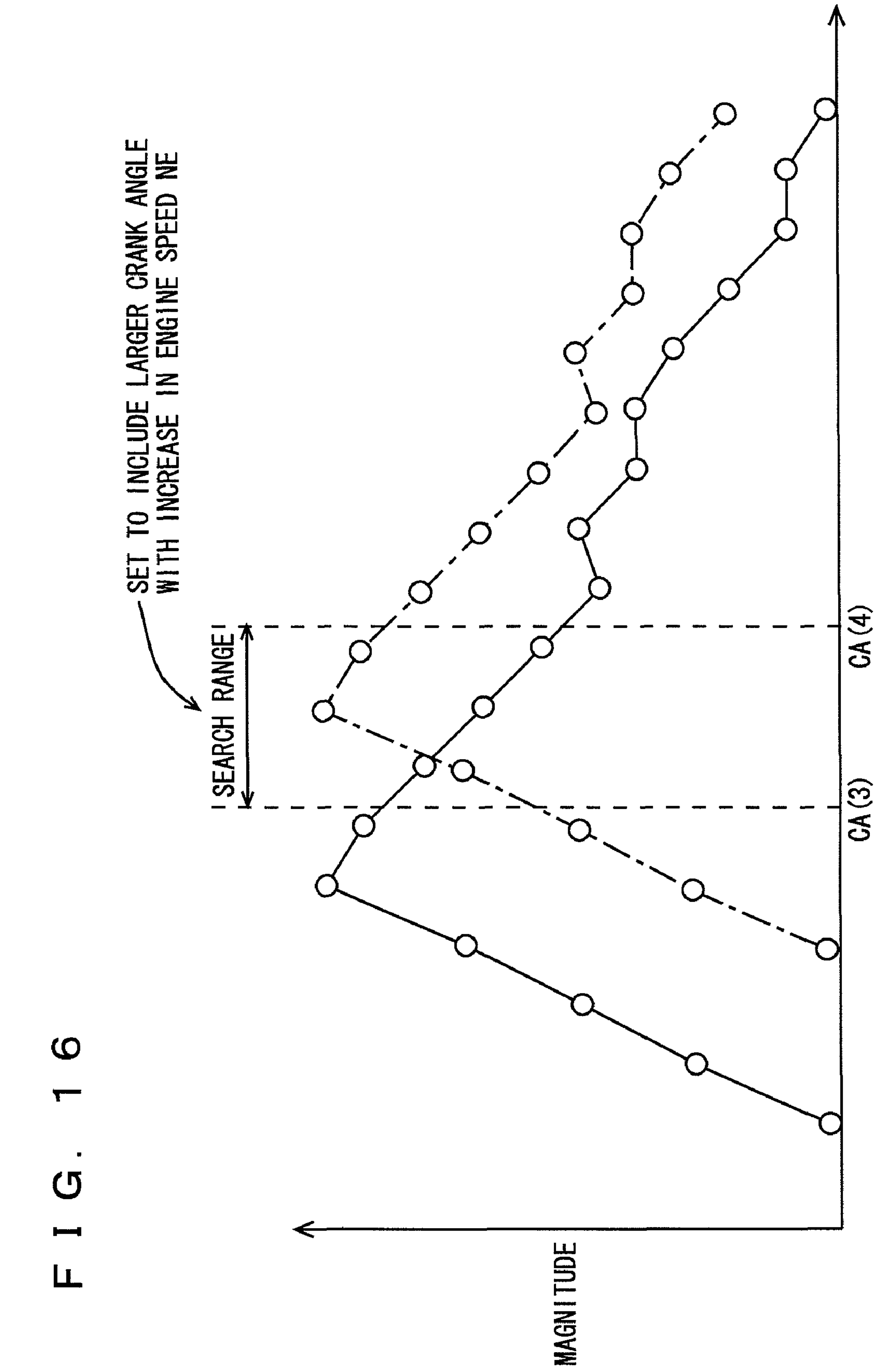
FIG. 16 is a chart (No. 3) illustrating a search range of a peak value P.

In this embodiment, therefore, the search range of the crank angle of peak value P is set to include the crank angle that increase with engine speed NE (S106) as illustrated in FIG. 16. Thereby, the search range can follow the vibration waveform. Therefore, the search range can include the crank angle of peak value P independently of engine speed NE.

The largest integrated value is detected in this search range, and peak value P in the vibration waveform is set (S108).

Also, the crank angle of the largest integrated value is detected in the search range, and is set as the crank angle of peak value P in the vibration waveform (S110). Thereby, peak value P in the vibration waveform and the crank angle thereof can be precisely detected.

The integrated value in the vibration waveform of engine 100 is divided by calculated peak value P to normalize the vibration waveform (S112). By the normalization, the magnitude of the vibration in the vibration waveform is expressed as a dimensionless number in a range from 0 to 1. In this manner, it is possible to compare the detected vibration waveform with the knock waveform model independently of the magnitude of the vibration. Therefore, it is not necessary to store the large number of knock waveform models corresponding to the magnitudes of the vibrations, and this allows easy forming of the knock waveform model.

The timing according to which the vibration attains the largest magnitude in the knock waveform model is configured to match the crank angle of peak value P (see FIG. 6). In this state, correlation coefficient K is calculated by $K=(S-\Sigma\Delta S(I))/S$ based on the total $\Sigma\Delta S(I)$ of absolute values $\Delta S(I)$ of the deviations between the normalized vibration waveform and the knock waveform model at respective crank angles as well as value S obtained by integrating the magnitude of the vibration in the knock waveform model with respect to the crank angle (S114).

In this manner, a degree of matching between the detected vibration waveform and the knock waveform model can be converted into a number, and thereby can be objectively determined. Furthermore, by comparing the vibration waveform with the knock waveform model, it is possible to analyze whether the vibration is due to the knocking or not, from behavior of the vibration such as a vibration attenuating property.

Figure 17:
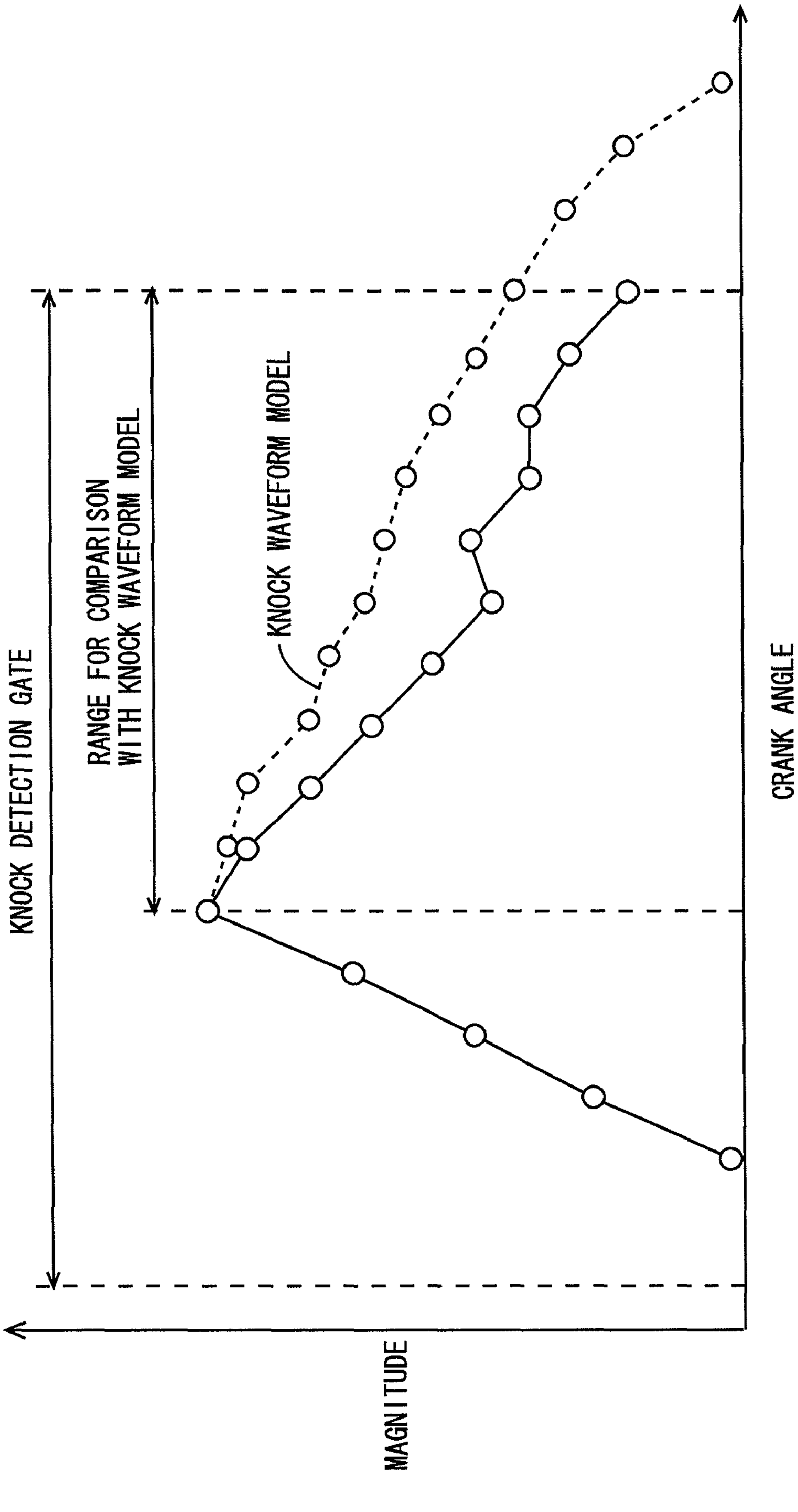
FIG. 17 is a chart (No. 2) for comparing the vibration waveform with the knock waveform model.

As illustrated in FIG. 17, when the crank angle corresponding to the knock waveform model includes the crank angle outside the knock detection gate, the vibration waveform and the knock waveform model are compared with each other through a range from the crank angle of peak value P to the crank angle at the end of the knock detection gate, and thereby correlation coefficient K is calculated. Thereby, the presence or absence of the knocking can be determined through a range not including the range where the waveform is not detected. Therefore, erroneous determination about the knocking can be suppressed.

Furthermore, knock magnitude N is calculated by dividing peak value P by BGL (S116). Thus, it becomes possible to analyze in more detail whether vibration of engine 100 is due to knocking or not.

When correlation coefficient K is greater than a predetermined value and further knock magnitude N is greater than predetermined determination value V(KX) (YES in S118), it is determined that knocking has occurred (S120), and the ignition timing is retarded (S122). As a result, the knocking is suppressed.

When correlation coefficient K is greater than a predetermined value and knock magnitude N is not greater than predetermined determination value V(KX) (NO in S118), it is determined that knocking has not occurred (S124) and the ignition timing is advanced (S126). Thus, by comparing knock magnitude N with determination value V(KX), the determination whether knocking has occurred or not is performed for each ignition cycle, and the ignition timing is retarded or advanced.

As described above, the engine ECU that is the knocking determination device of the embodiment sets the search range of peak value P in the vibration waveform such that the range includes a larger crank angle as engine speed NE increases. Thereby, the search range can be set to include always the crank angle at which the vibration peaks. Therefore, it is possible to detect precisely the crank angle that provides the reference for comparison between the vibration waveform and the knock waveform model. Consequently, a correct comparison can be performed between the vibration waveform and the knock waveform model, and the presence or absence of the knocking can be precisely determined.

In the embodiment, the search range is constant. However, the width of the search range can be changed according to engine speed NE. In this case, the width of the search range may be increased to include a larger crank angle with engine speed NE.

Instead of or in addition to engine speed NE, parameters such as a vehicle velocity and/or an acceleration related to engine speed NE may be used.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A knocking determination device of an internal combustion engine comprising:

a crank position sensor detecting a crank angle of said internal combustion engine; and an operation unit, wherein said operation unit detects a waveform of vibration of said internal combustion engine in a first range of the crank angle, in a manner corresponding to the crank angle, detects a crank angle satisfying a predetermined condition in a second range included in said first range, determines whether said internal combustion engine knocked or not, based on a result of a comparison performed, at the crank angle based on the crank angle satisfying said condition, between said detected waveform and a waveform model having a width smaller than that of said first range and defined as a reference of the waveform of the vibration of said internal combustion engine, detects an operation state of said internal combustion engine, and sets said second range according to the operation state of said internal combustion engine.

2. The knocking determination device of the internal combustion engine according to claim 1, wherein said predetermined condition is that the vibration attains the largest magnitude.

3. The knocking determination device of the internal combustion engine according to claim 1, wherein said operation state is an engine speed of said internal combustion engine.

4. The knocking determination device of the internal combustion engine according to claim 3, wherein said operation unit sets said second range to include the larger crank angle as an engine speed of said internal combustion engine increases.

5. The knocking determination device of the internal combustion engine according to claim 1, wherein when the crank angle corresponding to said waveform model includes a crank angle outside said first range in an operation of comparing said detected waveform with said waveform model, said operation unit determines whether said internal combustion engine knocked or not, based on a result of the comparison performed between said waveform model and said detected waveform at the crank angle causing said first range to overlap with the crank angle corresponding to said waveform model.

6. A knocking determining method comprising the steps of:

detecting a crank angle of said internal combustion engine;

detecting a waveform of vibration of said internal combustion engine in a first range of the crank angle, in a manner corresponding to the crank angle;

detecting a crank angle satisfying a predetermined condition in a second range included in said first range;

determining whether said internal combustion engine knocked or not, based on a comparison performed, at the crank angle based on the crank angle satisfying said condition, between said detected waveform and a waveform model having a width smaller that of said first range and defined as a reference of the waveform of the vibration of said internal combustion engine, detecting an operation state of said internal combustion engine; and setting said second range according to the operation state of said internal combustion engine.

7. The knocking determination method of the internal combustion engine according to claim 6, wherein said predetermined condition is that the vibration attains the largest magnitude.

8. The knocking determination method of the internal combustion engine according to claim 6, wherein said operation state is an engine speed of said internal combustion engine.

9. The knocking determination method of the internal combustion engine according to claim 8, wherein said step of setting said second range sets said second range to include the larger crank angle as an engine speed of said internal combustion engine increases.

10. The knocking determination method of the internal combustion engine according to claim 6, wherein said step of determining whether the knocking occurred or not includes a step of determining whether said internal combustion engine knocked or not, based on a result of the comparison performed between said waveform model and said detected waveform at the crank angle causing said first range to overlap with the crank angle corresponding to said waveform model, when the crank angle corresponding to said waveform model includes a crank angle outside said first range in an operation of comparing said detected waveform with said waveform model.

11. A knocking determination device of an internal combustion engine comprising:

means for detecting a crank angle of said internal combustion engine;

means for detecting a waveform of vibration of said internal combustion engine in a first range of the crank angle, in a manner corresponding to the crank angle;

means for detecting a crank angle satisfying a predetermined condition in a second range included in said first range;

determining means for determining whether said internal combustion engine knocked or not, based on a comparison performed, at the crank angle based on the crank angle satisfying said condition, between said detected waveform and a waveform model having a width smaller that of said first range and defined as a reference of the waveform of the vibration of said internal combustion engine;

means for detecting an operation state of said internal combustion engine (100); and setting means for setting said second range according to the operation state of said internal combustion engine.

12. The knocking determination device of the internal combustion engine according to claim 11, wherein said predetermined condition is that the vibration attains the largest magnitude.

13. The knocking determination device of the internal combustion engine according to claim 11, wherein said operation state is an engine speed of said internal combustion engine.

14. The knocking determination device of the internal combustion engine according to claim 13, wherein said setting means includes means for setting said second range to include the larger crank angle as an engine speed of said internal combustion engine increases.

15. The knocking determination device of the internal combustion engine according to claim 11, wherein said determining means includes means for determining whether said internal combustion engine knocked or not, based on a result of the comparison performed between said waveform model and said detected waveform at the crank angle causing said first range to overlap with the crank angle corresponding to said waveform model, when the crank angle corresponding to said waveform model includes a crank angle outside said first range in an operation of comparing said detected waveform with said waveform model.

* * * * *